United States Patent
Strike et al.

(10) Patent No.: US 6,293,706 B1
(45) Date of Patent: Sep. 25, 2001

(54) DUAL-MODE SOCKET CONNECTORS

(75) Inventors: Richard JA Strike, London; Justin A Drummond-Murray, Chorleywood; Christopher Byham, Leighton Buzzard; Malcolm G Brown, Hemel Hempstead; Lee C Harrison, Chelmsford, all of (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/511,113

(22) Filed: Feb. 23, 2000

(30) Foreign Application Priority Data

Nov. 4, 1999 (GB) .................................................. 9925998

(51) Int. Cl.[7] ........................................................ G02B 6/36
(52) U.S. Cl. ............................... 385/53; 385/75; 385/88; 385/147
(58) Field of Search .............................. 385/53, 58, 75, 385/88–92, 147; 439/577

(56) References Cited

U.S. PATENT DOCUMENTS

| | | | | |
|---|---|---|---|---|
| 5,419,717 | * | 5/1995 | Abendschein et al. | 439/577 |
| 5,615,292 | * | 3/1997 | Beckwith | 385/89 |
| 5,896,480 | * | 4/1999 | Scharf et al. | 385/88 |
| 6,227,720 | * | 5/2001 | Isaksson | 385/75 |

FOREIGN PATENT DOCUMENTS

0292024-A2 * 11/1988 (EP) .
0840151-A2 * 5/1998 (EP) .

* cited by examiner

*Primary Examiner*—John D. Lee
*Assistant Examiner*—Juliana K. Kang
(74) *Attorney, Agent, or Firm*—Nixon & Vanderhye P.C.

(57) ABSTRACT

A socket connector has a single socket including fiber optic terminals 10 and wire terminals 12 and is adapted to receive alternatively in respectively inverted positions either a first plug connector for cooperation with the fiber optic terminals or a second plug connector for cooperation with the wire terminals, in each case without engagement with the terminals with which the plug should not cooperate. The connector includes respective latching slots 7 and 11 in opposite walls 5 and 3 for the respective plug connectors.

13 Claims, 4 Drawing Sheets

DUAL-MODE SOCKET CONNECTORS

FIELD OF THE INVENTION

This invention relates to socket connectors intended for the reception of compatible plug connectors attached to transmission lines or cables, the combination of the plug and socket connectors providing signal coupling between the transmission lines or cables and the operational circuits of a signal handling or processing device. The invention is particularly though not exclusively intended for incorporation into the physical structure of a port of a network device for use in a packet-based data communication system.

BACKGROUND TO THE INVENTION

There exists a variety of media for the propagation of signals in packet-based data communication networks and other communication networks. One broad division of transmission media is between optical fibres and electrically conductive elements such as 'twisted-pair' transmission lines. In the field of packet-based data communication systems, it is known for physical layer devices which provide for signal translation between a media independent interface within a network device and a transmission medium and vice versa to be capable of operation in different modes and in particular to produce or receive signals in formats appropriate for transmission along optical fibres or conductive transmission lines respectively. However, owing to the different physical nature of a fibre optic line and a conductive line, physical connectors for fibre optic lines are physically different from connectors for conductive transmission lines and the two types of connectors are not physically compatible. Accordingly, it is normal practice even if a device is operable in the different modes mentioned above to provide respective different ports for fibre optic lines and conductive transmission lines.

The object of the present invention is to provide a single socket connector which is separately compatible with both a plug connector for a fibre optic line and a plug connector for a conductive transmission line.

It is known to provide a plug connector, of which an example is known as a VF45 connector, which can be inserted into a socket connector that includes two optical fibre terminators which on insertion of the plug connector into the socket connector engage corresponding optic fibre elements in the plug. It is also known to provide a connector, for example a RJ45 connector, which includes a multiplicity of conductive terminations which are disposed in respective grooves and which can engage on insertion into a compatible socket connector a respective multiplicity of terminal wires. It is also known from U.S. Pat. No. 5,419,717, EP-A-0292024 and EP-A-0840151 to provide connectors which can provide simultaneous fibre optic connection and wire connection in respective side-by-side sockets.

In a preferred form of the invention, a socket connector comprises a single socket which includes fibre optic terminators and wire terminals and is adapted to receive alternatively and one at a time in respectively inverted positions either a first plug connector which cooperates with the fibre optic terminators without interference with the wire terminals or a second plug connector which cooperates with said wire terminals without interference with the fibre optic terminators.

Thus the socket can receive either the fibre optic plug connector one way up or the wire terminal plug connector the other way up and is separately compatible with both connectors. The invention provides the user with the mutually exclusive choice of fibre optic connection or wire connection within the same socket connector.

Preferably the socket connector includes a first datum wall spaced from a second datum wall, said fibre optic terminators extending between and generally parallel to said walls and said wire terminals being disposed adjacent said first wall, and wherein a latching slot for said first plug connector is provided in said first wall and a latching slot is provided for the second plug connector in said second wall.

A specific example of the invention will be described with reference to the accompanying drawings.

DETAILED DESCRIPTION OF THE EXEMPLARY EMBODIMENT

Figure 1:
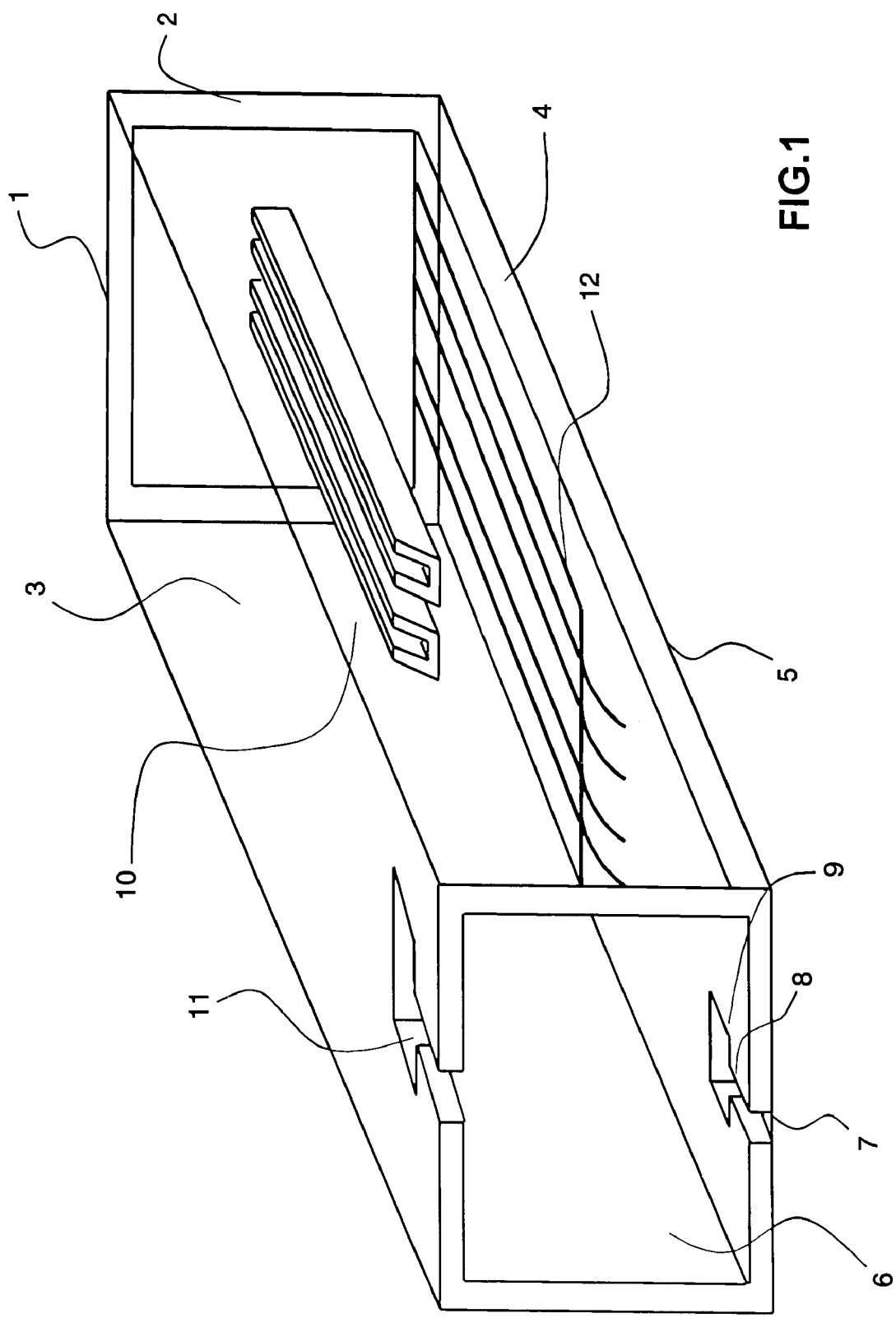
FIG. 1 is a simplified perspective view of a socket connector according to the invention.

FIG. 1 illustrates in a simplified form a socket connector 1 which is adapted so that it can provide connection from respective optic fibre terminators and conductive wire terminals to a plug connector such as a VF45 connector which would be connected to a dual fibre optic transmission line and to a plug connector such as an RJ45 plug connector which would be connected to a conductive transmission line composed for example of one or (more usually) more than one twisted-pair.

The socket connector is in this embodiment in the general form of an elongate open tube particularly of generally rectangular cross-section, having a first end wall 2, a top wall 3, a first side wall 4, a bottom wall 5 and an opposite side wall 6. The top and bottom walls 3 and 5 are generally parallel to each other and the side walls 4 and 6 are generally parallel to each other.

In the bottom wall 5 of the connector and at the mouth of the socket connector opposite the end wall 2 is a latching slot 7 which in this embodiment is constituted by a longitudinal channel 8 terminating in a slightly broader, rectangular aperture 9. Extending from the end wall 2 between and parallel to the top and bottom walls 3 and 5 is at least one and preferably a pair of fibre optic terminators 10. These comprise channelled guides which may be engaged physically to provide optical coupling by a compatible connector such as a VF45 connector which would be inserted in the mouth of the socket connector 1 such that the wall 3 is a datum wall and on the side of the connector opposite that which engages the datum wall 3 a resilient lug engages the latching slot 7 so that the plug is removably but securely positioned within the socket connector.

The connector 1 also includes in the top wall 3 a latching slot 11 which may be generally similar to the latching slot 7, though for the plug connector mentioned below will be slightly larger than the latching slot 7, positioned for engagement with a resilient lug on a connector such as an RJ45 connector for which the datum surface will be the bottom wall 4 and which has on its underside engaging the bottom wall 4 termination wires disposed in grooves. The socket connector 1 has adjacent the bottom wall a set of generally parallel spring wire terminals 12 positioned for engagement with the conductive terminals of a connector such as an RJ45 connector. The significance of the arrangement is that since the plug connectors have opposite datum surfaces neither needs to have extensive engagement with the wall opposite to that which it respectively uses as a datum surface and therefore it is possible to dimension the socket connector so that the plug connector for the fibre optic coupling does not interfere with or damage the terminal wires 12 and the plug connector for the wire terminals does not interfere with or damage the fibre optic terminators 10.

Figure 5:
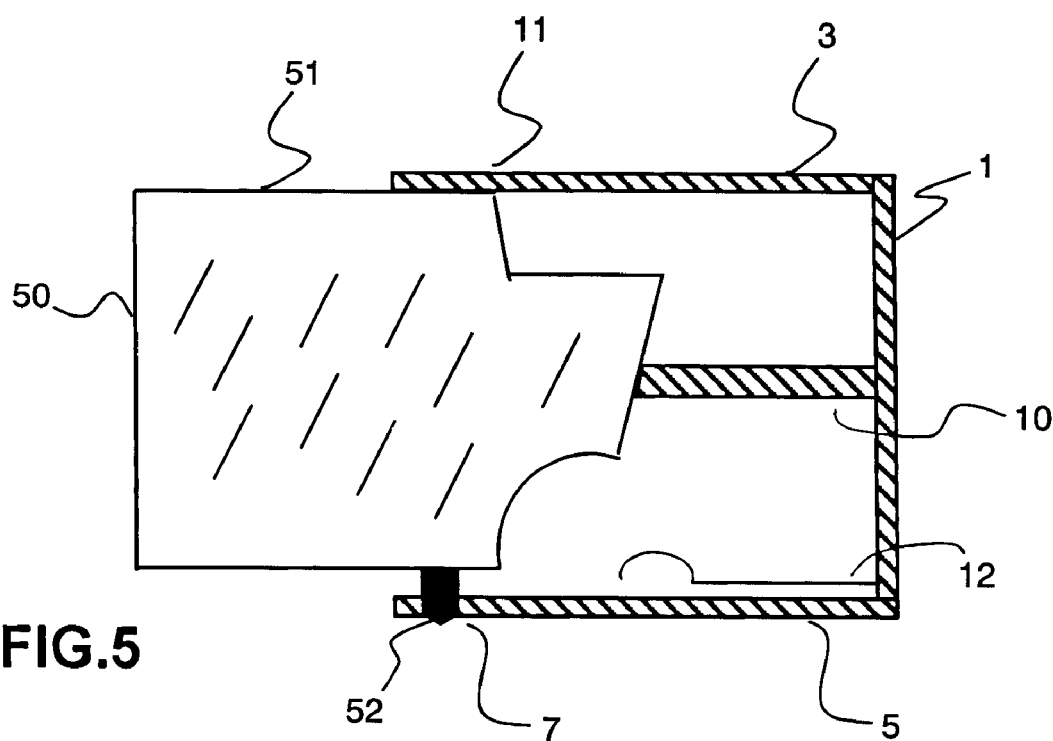
FIGS. 5 and 6 illustrate the insertion of respective types of plug in the same connector.
Figure 6:
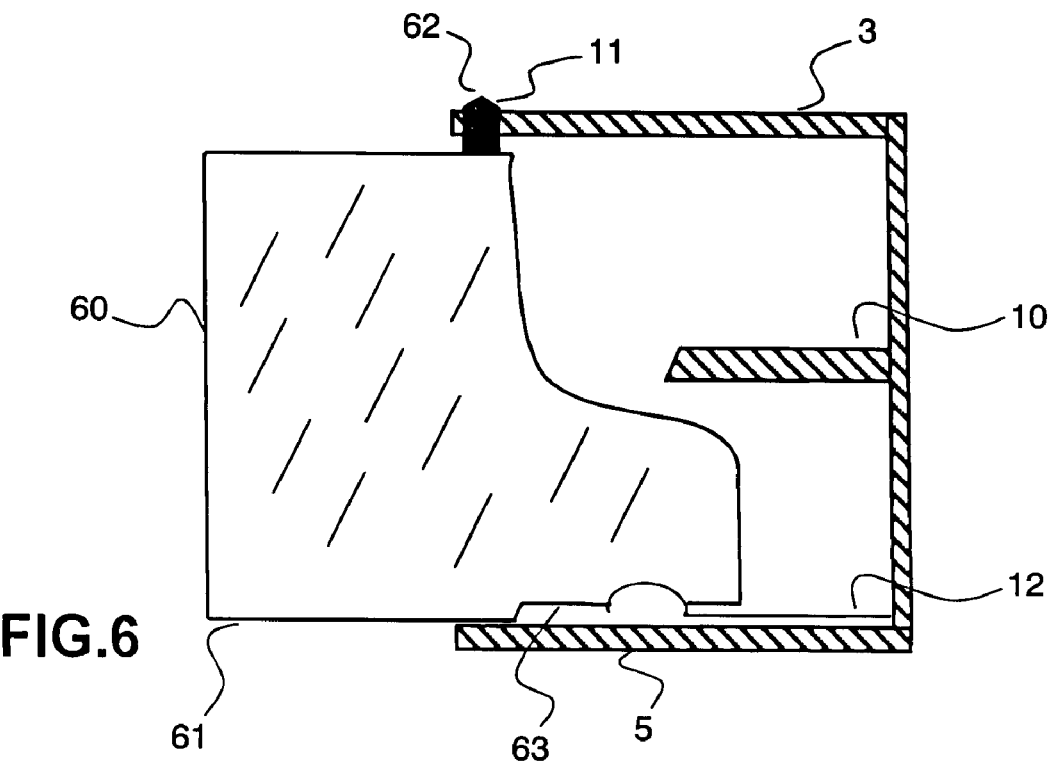

The separate compatibility of the single socket connector with both types of connector, used one at a time, will be further apparent from FIGS. 5 and 6.

FIG. 5 illustrates, in simplified form, a dedicated fibre optic plug connector 50, such as a type VF45, inserted in socket 1 in its normal orientation for insertion, an upper side 51 of connector 50 engaging the datum surface provided by inner side of the top wall 3. The connector 50 has a resilient lug 52 on its underside, this lug engages latching slot 7 in bottom wall 3. The connector 50 engages fibre optic terminator 10 but does not engage, and therefore does not interfere with or damage, wire terminals 12.

FIG. 6 illustrates, again in simplified form, a dedicated wire terminal connector 60, such as a type RJ45, inserted in socket 1. In this case the connector has to be turned upside down (i.e inverted relative to position occupied by connector 50) so that the 'upper' side 61 of the plug 60 is now underneath and engages the datum surface provided by bottom wall 5. The resilient lug 62 which is normally on the underside of the connector 60 engages the latching slot 11 in the upper wall 3 of the socket. The terminals 63 of the plug engage the wire terminals 12 of the socket but the connector does not engage, and therefore does not interfere with or damage, the fibre optic terminals 10.

A socket connector as described with reference to FIG. 1 may be used in a signal port in conjunction with an ancillary switching circuit which allows the selective coupling of both the wire terminals and a fibre optical transceiver to the same internal terminals, e.g. pins of a printed circuit board.

Figure 2:
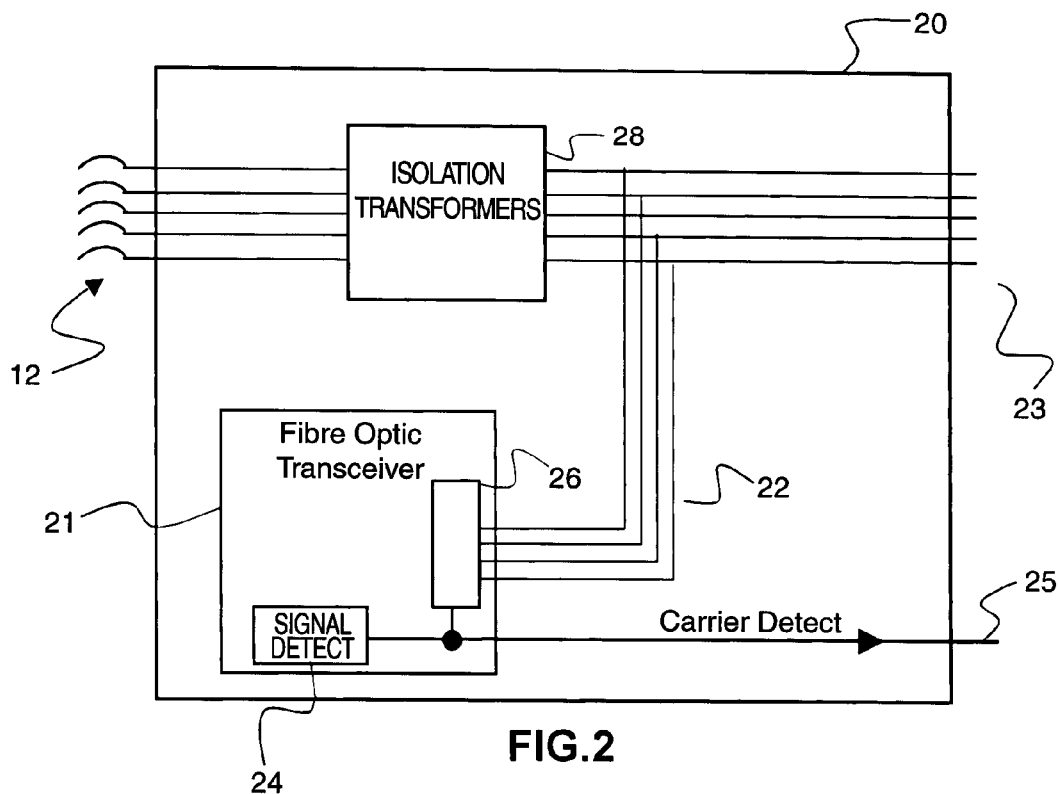
FIGS. 2, 3 and 4 are schematic drawings of different ancillary circuits for use with the socket connector.

FIG. 2 illustrates a first switching circuit 20 which includes a fibre-optic transceiver 21. This may be generally in known form. It is in signal coupling relationship with the fibre optic plug connector when the latter is inserted in the socket connector. The fibre optic transceiver's input and output lines 22 are coupled to respective pins 23 disposed for connection to a printed circuit board (not shown) and the wire terminals are also coupled to these pins 23, preferably by way of isolation transformers 28, which are normally provided for each active pair of signals and provide electrical isolation between the electrical terminals 12 and all other conductors within the equipment.

Figure 3:
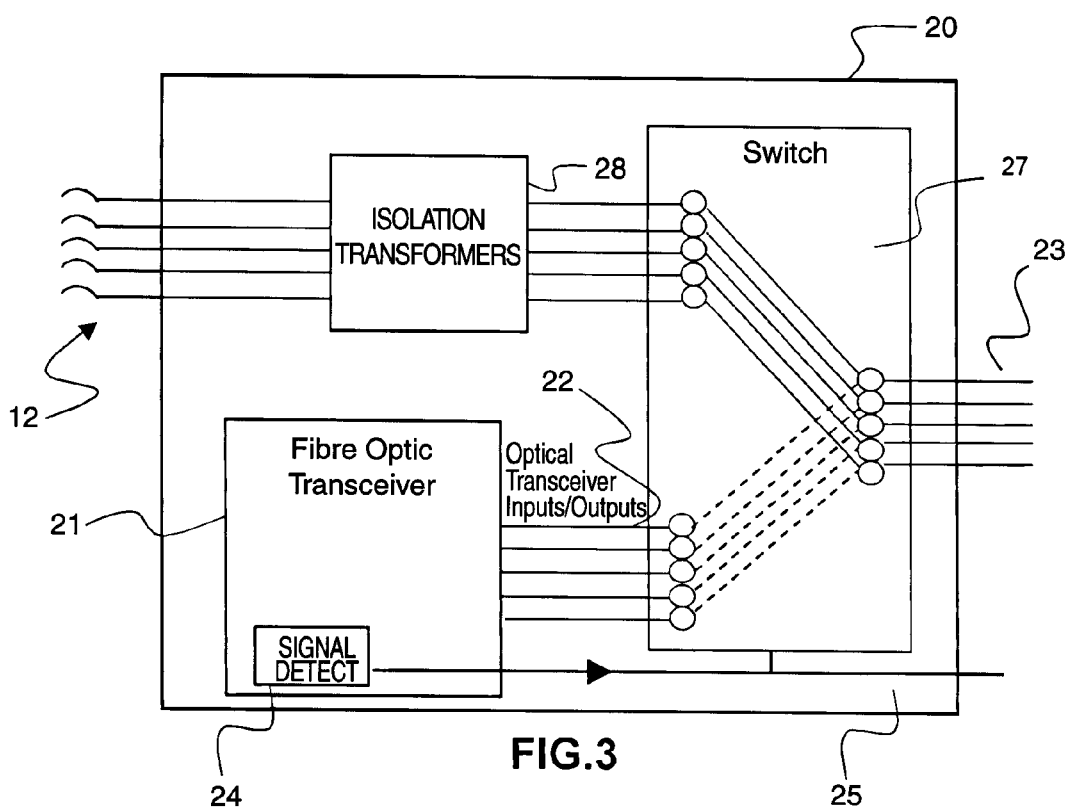

It is customary for a fibre optic receiver to include a 'signal detect function' 24 which provides a signal on line 25 indicating whether an optical carrier signal is being received from the fibre optic plug connector. This may be used to allow coupling of the transceiver to pins 23 when the 'signal detect' signal is asserted but to put the input/output lines of the transceiver into a high impedance state by means of 'tristate' circuits 26 in the absence of a carrier signal. Alternatively, the wire terminals 12 and the transceiver's input/output lines 22 may be connected by a multiple ('ganged') switch 26 to the terminal pins 23, as shown in FIG. 3. The 'signal detect' line may be connected to operate switch 26 such that if an optical carrier signal is present the signal detect line 24 will operate switch 26 to connect the input/output lines 22 to the pins 23 whereas if no carrier signal is detected the wire terminals 12 are coupled (by way of isolation transformers 28) to the pins 23. Since it is impossible when a fibre connector is inserted to drive the wire terminals 12 and when a wire connector is inserted for optical carrier to be present, the two switch modes are mutually exclusive.

Figure 4:
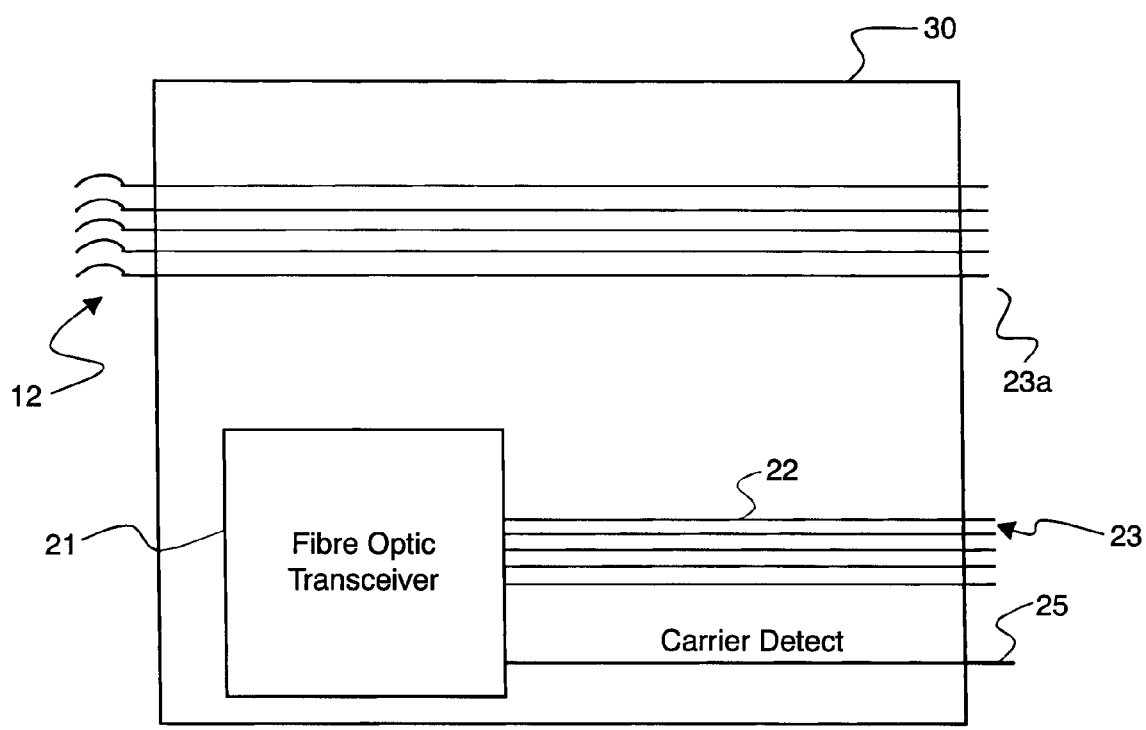

The signal detect lines would also be coupled to a physical layer device (PHY) which determines which logic levels to employ for encoding and decoding depending on which mode of connection is employed. However, it may be desirable to separate the terminal sets completely and FIG. 4 illustrates an ancillary circuit arrangement 30 wherein the input/output lines 22 of the fibre optic transceiver 21 are directly and exclusively connected to terminal pins 23 whereas the wire terminals 12 are directly and exclusively connected to a separate set of terminal pins 23a. In this version the electrical isolation of the terminals may be external to the connector and is not shown.

What is claimed is:

1. A socket connector which comprises a single socket including at least one fibre optic terminal and wire terminals and configured to receive, alternatively and in respectively inverted positions, either a first plug connector for cooperation with the fibre optic terminal without engagement with said wire terminals or a second plug connector for cooperation with the wire terminals without engagement with said fibre optic terminal.

2. A signal port including a socket connector according to claim 1 and an ancillary circuit which includes a plurality of signal lines, a fibre optic transceiver including means for detecting an optical carrier signal from said second plug and switching means, controlled by the means for detecting, for enabling and disabling connections between the transceiver and said signal lines.

3. A signal port according to claim 2 wherein said wire terminals are coupled to said signal lines.

4. A signal port according to claim 2 wherein said switching means is internal to said transceivers.

5. A signal port according to claim 2 wherein said switching means is disposed to couple said signal lines to said wire terminals and said transceivers alternatively.

6. A signal port including a socket connector according to claim 1 and an ancillary circuit which includes a fibre optic transceiver, a first set of terminal pins connected to the transceiver and a second set of terminal pins connected to said wire terminals.

7. A socket connector according to claim 1 wherein said socket includes a first datum wall spaced from a second datum wall, a fibre optic terminal extending between and generally parallel to said walls and wire terminals disposed adjacent said first wall, a latching slot in said first wall for said first plug connector and a latching slot in said second wall for said second plug connector.

8. A socket connector comprising a socket including a first datum wall spaced from a second datum wall, a fibre optic terminal extending between and generally parallel to said walls and wire terminals disposed adjacent said first wall, a latching slot in said first wall for a first plug connector for cooperation with said fibre optic terminal and a latching slot in said second wall for a second plug connector for cooperation with said wire terminals.

9. A signal port including:

a socket connector including a first datum wall spaced from a second datum wall, a fibre optic terminal extending between and generally parallel to said walls and wire terminals disposed adjacent said first wall, a latching slot in said first wall for a first plug connector for cooperation with said fibre optic terminal and a latching slot in said second wall for a second plug connector for cooperation with said wire terminals; and an ancillary circuit which includes a plurality of signal lines, a fibre optic transceiver including means for detecting an optical carrier signal from said second plug and switching means, controlled by the means for detecting, for enabling and disabling connections between the transceiver and said signal lines.

10. A signal port according to claim 9 wherein said wire terminals are coupled to said signal lines.

11. A signal port according to claim 9 wherein said switching means is internal to said transceivers.

12. A signal port according to claim 9 wherein said switching means is disposed to couple said signal lines to said wire terminals and said transceivers alternatively.

13. A signal port including a socket connector including a first datum wall spaced from a second datum wall, a fibre optic terminal extending between and generally parallel to said walls and wire terminals disposed adjacent said first wall, a latching slot in said first wall for a first plus connector for cooperation with said fibre optic terminal and a latching slot in said second wall for a second plug connector for cooperation with said wire terminals; and an ancillary circuit which includes a fibre optic transceiver, a first set of terminal pins connected to the transceiver and a second set of terminal pins connected to said wire terminals.

\* \* \* \* \*